United States Patent Office 3,764,455
Patented Oct. 9, 1973

3,764,455
REFLECTIVE SURFACE AND METHOD
OF PRODUCTION
John A. Lovell, Monroe Falls, and Donald V. Hillegass, Akron, Ohio, assignors to The Goodyear Tire & Rubber Company, Akron, Ohio
No Drawing. Filed Apr. 1, 1970, Ser. No. 24,886
Int. Cl. B60c 13/00; B32d 5/16
U.S. Cl. 161—162
3 Claims

ABSTRACT OF THE DISCLOSURE

A reflective surface containing spherical glass beads of 50 to 300 microns in size, where the beads are preferably sprinkled on the surface while it is still in an adhesive state.

This invention relates to elastic reflective surfaces and more particularly, to elastic reflective surfaces, preferably on substrates or laminates and tires and to the method for the preparation of said elastic reflective surfaces.

Heretofore, it has been desired to produce surfaces having high reflectivity in regard to light but the achievement of said reflectivity under light tends to affect the appearance of the surface in normal daylight. Also, the reflective surfaces achieved before have been relatively inelastic and when bent or stretched the surfaces have tended to lose their reflective power.

Therefore, it is an object of this invention to provide a method for obtaining elastic surfaces having relatively high reflective power when illuminated by light and to the resulting surfaces or laminates.

In the practice of this invention, various cured rubbers, such as natural rubber and synthetic rubbers can be used as a substrate to form the laminate. For example, they could be the diene polymers such as butadiene-styrene copolymers, butadiene-acrylonitrile copolymers, polyisoprene, polybutadiene, isoprene-butadiene copolymers, butyl rubber, ethylene-propylene copolymers, and ethylene-propylene terpolymers. Typically, the various polymers are cured by normal curing methods and recipes such as with sulfur or with peroxides, in the case of the ethylene-propylene copolymers.

It is preferred that the elastic reflective surface of this invention be produced by loading a polyurethane with fillers to enhance its physical properties. Thus, it is preferred that the cured polyurethane contains from about 5 to about 100 weight percent of typical particular rubber reinforcing fillers, such as carbon black, titanium dioxide, zinc oxide, calcium carbonate, filler clays, silicas and coloring pigments, depending on the color desired. The addition of the reinforcing fillers preferably provides a cured polyurethane having an ultimate tensile strength of from about 300 pounds per square inch (p.s.i.) to about 2000 p.s.i. and higher, measured on an Instron tester at a crosshead of 5 inches per minute at 25° C. and with a corresponding ultimate elongation of from about 700 percent to about 250 percent at about 25° C. according to the generally accepted rubber testing methods. Thus, such a filler-reinforced cured polyurethane with a tensile strength of about 300 p.s.i. has an elongation in the range of about 700 percent and such a filler-reinforced cured polyurethane with a tensile strength of about 2000 p.s.i. has an elongation in the vicinity of 250 percent. Therefore, the loaded cured polyurethane preferably has physical properties such as tensile strength and elongation similar to the cured rubber tire on which it is a laminate.

The cured polyurethanes of this invention are usually prepared by reacting any of the reactive hydrogen containing polymeric materials of about 700 to 4500 molecular weight with an organic polyisocyanate such that the ratio of isocyanato groups to the reactive hydrogen containing groups of the reactive hydrogen containing polymeric material is from about 1/1 to about 2.5/1, and preferably from about 1/1 to about 1.5/1. They are generally reacted at temperatures of from about 20° C. to about 150° C. under preferably substantially anhydrous conditions. The reactive hydrogens are supplied by the hydroxyl groups of the reactive hydrogen containing polymeric material.

The preferred class of hydroxyl terminated reactive hydrogen containing polymeric materials used to prepare the polyurethanes are typically the hydroxyl containing polymers of 1,3-butadiene, of isoprene, their copolymers, copolymers of 1,3-butadiene and styrene, copolymers of 1,3-butadiene and styrene, copolymers af 1,3-butadiene and acrylonitrile, copolymers of 1,3-butadiene and ethyl acrylate and copolymers of 1,3-butadiene and chloro-1,3-butadiene. Particularly useful polymers are the hydroxyl polybutadiene, hydroxyl polyisoprene and hydroxyl copolymers of butadiene-isoprene, butadiene-styrene, and butadiene-acrylonitrile. The other classes of reactive hydrogen containing polymeric material such as polyester polyols and polyether polyols can be used, too.

It is generally preferred that the hydroxyl terminated polymers of the diene type have a hydroxyl functionality of from about 2.1 to about 2.5. They typically have a viscosity at about 30° C. of from about 10 poises to about 150 poises and more generally from about 20 poises to about 100 poises.

If desired, a catalyst can be used to increase the reaction rate between the reactive hydrogen containing material and the polyisocyanate. Suitable catalysts are the well-known catalysts typically used for polyurethanes. Representative of the various catalysts are dibutyltin dilaurate; stannous octoate; magnesium oxide; butyl aldehyde-butyl amine condensation product; 2-mercaptobenzothiazole; cobalt naphthenate; and tertiary amines such as triethylene diamine; methylated tetraethylene tetramine; and hexamethylene tetramine. It has been found that the organotin compounds such as dibuyltin dilaurate and stannous octoate are quite useful in this regard.

It is an important feature of this invention that additional solvents are generally not needed to effect the adherent laminate. However, if desired, small amounts of nonreactive solvents can be used with the polyurethane reaction mixture, such as up to about 10 percent by weight of the solvent. Representative of the many suitable solvents are benzene, toluene, the paraffinic, naphthenic and aromatic naphthyls, liquid ketones such as acetone, methyl ethyl ketone, diethyl ketone, methyl isoamyl ketone, diisobutyl ketone, cellusolve acetate, dioxane and chlorinated hydrocarbons such as trichloroethylene, methylene chloride, etc. The addition of a solvent to the polyurethane reaction mixture can become desirable where its viscosity is required to be adjusted for spray applications.

Various aliphatic, alicyclic and aromatic organic polyisocyanates can be used to prepare the isocyanate-terminated polyurethanes. Representative examples include 1,6-hexamethylene diisocyanate,
1,10-decamethylene diisocyanate,
1,4-cyclohexylene diisocyanate,
4,4'-methylene-bis(cyclohexylisocyanate),
1,5-tetrahydronaphthalene diisocyanate,
isophorone diisocyanate,
the 2,4- and 2,6-toluene diisocyanates,
m-phenylene diisocyanate,
diphenylmethane-4,4'-diisocyanate,
hydrogenated diphenylmethane-4,4'-diisocyanate, and
3,3'-dimethyl-4,4'-bis phenylene diisocyanate, as well as the polyalkylene-polyarylene isocyanates as more particularly referred to in U.S. Pat. 2,683,730.

It is a further important feature of this invention that the preparation of the cured rubber surface of the substrate such as a tire need only be prepared by cleaning with a suitable solvent for the purposes of removing surface oils and the like. Any of the various solvents used for dissolving oils can be used which do not dissolve or swell the rubber surface. Representative of such solvents are mineral spirits, Stoddard solvent, liquid ketones such as acetone, methyl ethyl ketone, methyl isobutyl ketones, diisobutyl ketone, diethyl ketone, methyl isoamyl ketone, liquid alcohols such as methanol, ethanol, isopropanol and butanol, aromatic hydrocarbons such as benzene, toluene and xylene, aliphatic hydrocarbons such as pentane, hexane, heptane, neohexane (2,2-dimethylhexane) and dimethyl pentane and dimethyl formamide. The mineral spirits, sometimes known as petroleum spirits, is typically identified by ASTM Test D235–61 and the Stoddard solvent is typically identified by ASTM Test D484–52 as a specification for the solvent approved as a United States standard by the United States Standard Institute.

The following illustrative and representative examples are set forth to further exemplify the objects and advantages of the invention. The parts and percentages are by weight unless otherwise indicated.

EXAMPLE I

A black colored cured butadiene-styrene pneumatic tire having a sidewall with 2 circumferential grooves about 0.5 inch wide therein and an 0.5 inch bond therebetween was prepared by first cleaning at least one of the said grooves with mineral spirits at about 25° C. to remove surface oils, and dried. The surface of the groove was then coated with the polyurethane reaction mixture. Before the polyurethane reaction mixture spread on the tire had reacted fine glass beads were sprinkled over the surface from a salt shaker having suitable openings in the lid, and then the polyurethane reaction mixture on the tire sidewall was allowed to react and cure at about 25° C. for about a half hour.

For this example, the white polyurethane reaction mixture was prepared by the following method:

To 100 parts of a hydroxyl terminated polybutadiene having a viscosity of about 50 poises at 30° C. and a hydroxyl functionality of about 2.1 (obtainable as R–45M poly BD resin from the Arco Chemical Company, division of the Atlantic Richfield Company), was mixed 70 parts of a mixture of titanium dioxide, zinc oxide, and calcium carbonate as a reinforcing and coloring filler. To this mixture was then added 0.1 part of dibutyltin laurate. To the resulting mixture was mixed 9.2 parts of a liquid hydrogenated diphenylmethane - 4,4' - diisocyanate (obtained as Hylene-W from the du Pont de Nemours & Company) at about 25° C. (sometimes referred to hereinafter as liquid hydrogenated MDI).

A sample of the resulting cured polyurethane had an ultimate tensile strength of about 850 pounds per square inch and an ultimate elongation of about 325 percent at about 25° C.

EXAMPLE II

A polyurethane was made using the following recipe:

| | Parts |
|---|---|
| Hydroxyl terminated polybutadiene | 26.5 |
| Aluminum powder | 2.5 |
| Glass beads (8350 granular) | 1.25 |
| Liquid hydrogenated MDI | 2.4 |
| Dibutyl tin dilaurate | 0.0001 |

The hydrogenated MDI was stirred into polybutadiene having the aluminum powder and glass beads uniformly dispersed therein and then drawn down into tensile sheets 1 inch by 2.5 inches and cured by standing at room temperature overnight.

Another batch of polyurethane was made using the recipe above except the glass beads were sprinkled on the drawn down sheets and allowed to cure at room temperature overnight. The samples sprinkled with glass beads had better light reflecting ability even when the strip was stretched and flexed.

Various glass beads were used to make samples according to the teachings of Example II. A commercial glass bead available under the trade name Flex-O-Lite where a 97.3 percent of the particles were less than 62 microns in diameter, 93 percent less than 40 microns did not produce a reflective surface. On the other hand, glass beads characterized as solid spheres having a bead size of .0046 to .0049 inch, a refractive index of 194, with a range of diameters of 72 to 130 microns and average particle size of approximately 100 microns gave the highest degree of reflectivity. Another glass bead available under trade name Prismo-Standard from Prismo Safety Corporation and characterized as solid spheres, having a range of 126–180 microns in diameter and average value of 150 microns gave good reflective surface but not as good as beads having range of 72–130 microns.

The California Specification traffic beads are solid particles but all the particles are not spherical in shape, although they are free of sharp edges. The California specification traffic beads vary in size from 300 to 860 microns. These beads gave results inferior to those obtained with Prismo-Standard beads in the above recipe.

The 3M beads of above 150 microns are almost equivalent to Prismo-Standard beads in reflectivity when used in the above recipe.

EXAMPLE III

A cured smoked sheet natural rubber bicycle tire was prepared by first cleaning the sidewall with mineral spirits to remove surface oils and any excess foreign matter therefrom and dried. Then a strip was painted with a polyurethane reaction mixture colored white with titanium dioxide, where the amount of titanium dioxide in the said mixture was adjusted to provide a white strip circumferentially around the sidewall.

These examples show that the method of this invention can be used for forming various highlight reflective elastic laminates on a cured rubber tire such as the formation of adherent colored sidewalls, the repair of colored sidewalls and, in particular, the sidewalls of bicycle tires. In the practice of this invention it is an important feature that the cured polyurethane is reinforced with a sufficient amount of rubber reinforcing fillers to provide a cured polyurethane having an ultimate tensile strength of from about 300 p.s.i. to about 2000 p.s.i. with a corresponding ultimate elongation of from about 700 percent to about 250 percent at about 25° C.

The range of particle sizes of the glass beads useful in this invention are about 50 to 300 microns where the beads are essentially spherical in diameter. The preferred range is about 100 to 250 microns since as the size decreases below about 50 microns the beads lose their reflectivity and tend to sink below the surface of the polyurethane coating. On the other hand, as the bead size exceeds about 300 microns, they tend to lose their collective reflective power and also are readily torn from the polyurethane surface since the adhesion is reduced.

The preferred method of applying the beads to the surface is to pour or sprinkle then on the surface while the polyurethane reaction mixture is still fluid and exhibits a tackiness or adhesiveness for the beads. At least 50 percent of the surface must be covered with beads to give a discernible degree of reflectivity and preferably in excess of 80 percent should be covered to give a uniform reflectivity. Of course, the best results are obtained from a saturated surface which is conveniently obtained by pouring an excess of beads on the surface and then decanting the excess after the polyurethane reaction mixture has reacted sufficiently to lose its tackiness.

EXAMPLE IV

Highly colored reflective elastic surfaces were prepared using masterbatches prepared by the following recipe:

| | Parts |
|---|---|
| Hydroxylated polybutadiene | 1000 |
| Calcium carbonate | 350 |
| Butylated reaction product of p-cresol and dicyclopentadiene | 12.5 |
| Pigment | 100 |

The above ingredients were mixed and run on a 3-roll paint mill overnight to obtain a smooth blend or masterbatch.

The yellow masterbatch was made with cyanamid chrome pigment No. 40-3614. Likewise the red, orange, and black masterbatches were made using the following pigments: Monastral red, valencia orange and HAF carbon black.

About 33 to 40 parts of each of these masterbatches was reacted with about 2.4 parts of liquid hydrogenated MDI in the presence of 0.001 part of dibutyltin dilaurate and spread to give a smooth surface film. Then this surface was sprinkled with glass spheres 0.046 to 0.049 inch in diameter and a refractive index of 1.94 to reduce the patent leather finish or gloss of the surface to a dull finish, which exhibited high reflective power when subjected to a beam of incident light.

While certain representative embodiments and details have been shown for the purpose of illustrating the invention, it will be apparent to those skilled in this art that various changes and modifications may be made therein without departing from the spirit or scope of the invention.

What is claimed is:

1. A reflective surface consisting essentially of an elastomeric polyurethane having at least 50 percent of its surface in the reflective area covered only with glass beads, each bead being partially embedded and adhered to the elastomeric polyurethane but having at least part of the bead surface exposed to the atmosphere, said bead being essentially spherical in shape and having a diameter greater than 50 microns and less than 300 microns, the polyurethane being the reaction product of an organic polyisocyanate with a hydroxyl terminated polymer of 1,3-butadiene, isoprene, chloro-1,3-butadiene and copolymers of these alone or with styrene, acrylonitrile and ethyl acrylate.

2. The reflective surface of claim 1 wherein the polyurethane is supported on a natural rubber or a rubbery diene polymer.

3. The reflective surface of claim 1 wherein at least 80 percent of the polyurethane surface is covered with the beads.

References Cited
UNITED STATES PATENTS

| | | | |
|---|---|---|---|
| 3,249,947 | 5/1966 | Williams | 117—33 UX |
| 2,567,233 | 9/1951 | Palmquist et al. | 117—29 X |
| 3,490,987 | 1/1970 | Bauriedel | 161—190 |
| 3,136,614 | 6/1964 | Kuzmick | 117—33 UX |
| 3,355,311 | 11/1967 | Gosselink | 117—33 |
| 3,510,439 | 5/1970 | Kaltenbach | 161—190 |
| 3,528,848 | 9/1970 | Zoebelein | 161—190 X |
| 3,538,055 | 11/1970 | Camilleri et al. | 161—190 X |
| 3,253,634 | 5/1966 | De Young | 152—353 |
| 3,382,908 | 5/1968 | Palmquist et al. | 152—353 |
| 3,573,954 | 4/1971 | Yamamoto | 117—33 |
| 3,452,799 | 7/1969 | Hindin et al. | 152—353 |

OTHER REFERENCES

Skeist, I.: Handbook of Adhesives, New York, Reinhold, 1962, ch. 26, pp. 333-343, by C. S. Schollenberger, Isocyanate-Based Adhesives.

GEORGE F. LESMES, Primary Examiner

C. E. LIPSEY, Assistant Examiner

U.S. Cl. X.R.

117—25, 29, 33; 152—353, Dig. 12; 161—190